(12) United States Patent
Wang et al.

(10) Patent No.: US 8,201,444 B2
(45) Date of Patent: Jun. 19, 2012

(54) AFTERTREATMENT DEVICE NOX CONVERSION EFFICIENCY DIAGNOSTICS USING ON BOARD ADAPTIVE DIAGNOSTIC ALGORITHM

(75) Inventors: Yue-Yun Wang, Troy, MI (US); Ognyan N. Yanakiev, Canton, MI (US); Charles E. Solbrig, Ypsilanti, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 389 days.

(21) Appl. No.: 12/537,395

(22) Filed: Aug. 7, 2009

(65) Prior Publication Data

US 2010/0043400 A1    Feb. 25, 2010

Related U.S. Application Data

(60) Provisional application No. 61/090,041, filed on Aug. 19, 2008.

(51) Int. Cl.
*G01M 15/10* (2006.01)
(52) U.S. Cl. .................................... 73/114.75
(58) Field of Classification Search ............... 73/114.69, 73/114.71, 114.72, 114.73, 114.75
See application file for complete search history.

(56) References Cited

U.S. PATENT DOCUMENTS

| 5,526,643 | A  | * | 6/1996  | Mukaihira et al. ............. 60/276 |
| 5,627,757 | A  | * | 5/1997  | Comignaghi et al. ........ 701/103 |
| 6,167,695 | B1 | * | 1/2001  | Itou et al. ........................ 60/274 |
| 7,059,112 | B2 | * | 6/2006  | Bidner et al. ................... 60/277 |
| 7,114,326 | B2 | * | 10/2006 | Mukaihira et al. ............. 60/277 |
| 7,294,252 | B2 | * | 11/2007 | Wang et al. .................... 205/781 |
| 2006/0242945 | A1 | * | 11/2006 | Wang et al. ................... 60/277 |
| 2007/0234708 | A1 | * | 10/2007 | Jones et al. .................... 60/277 |
| 2009/0165440 | A1 | * | 7/2009  | Sawada et al. ................. 60/276 |
| 2010/0043397 | A1 |   | 2/2010  | Wang et al. |
| 2010/0180576 | A1 |   | 7/2010  | Wang et al. |

FOREIGN PATENT DOCUMENTS

DE  197 49 400 A1  5/1999
DE  103 47 130 A1  6/2004

* cited by examiner

*Primary Examiner* — Eric S McCall

(57) ABSTRACT

A powertrain includes an internal combustion engine and an aftertreatment system having an aftertreatment device utilizing a catalyst to convert NOx. A method for indicating a malfunctioning catalyst includes monitoring an actual NOx content exiting the aftertreatment system, monitoring factors affecting conversion efficiency of the aftertreatment device, determining a predicted threshold NOx content exiting the aftertreatment system for an exemplary malfunctioning catalyst based upon the factors affecting conversion efficiency, comparing the actual NOx content exiting the aftertreatment system to the predicted threshold NOx content exiting the aftertreatment system, and indicating a malfunctioning catalyst based upon the comparing.

14 Claims, 6 Drawing Sheets

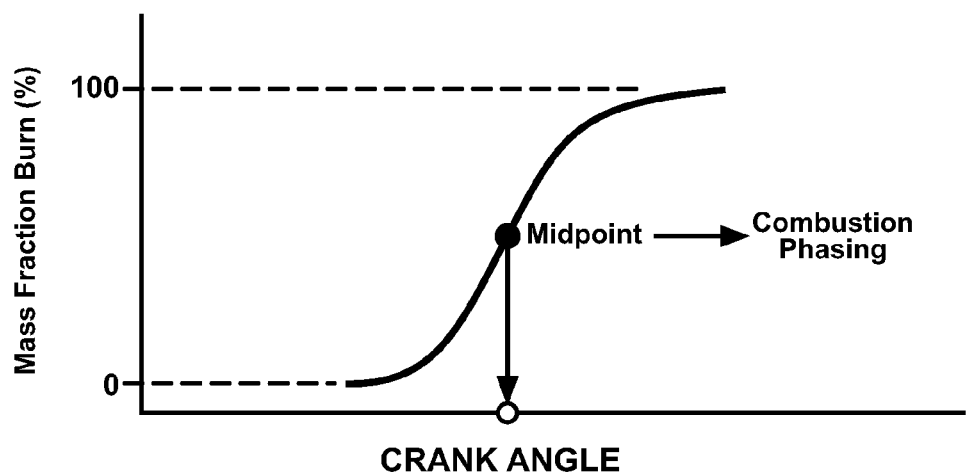
FIG. 6
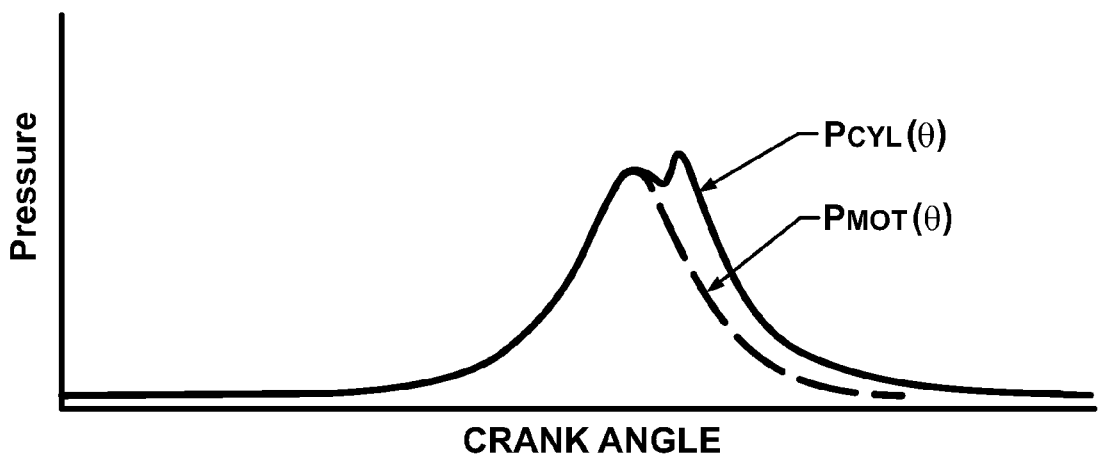
FIG. 7
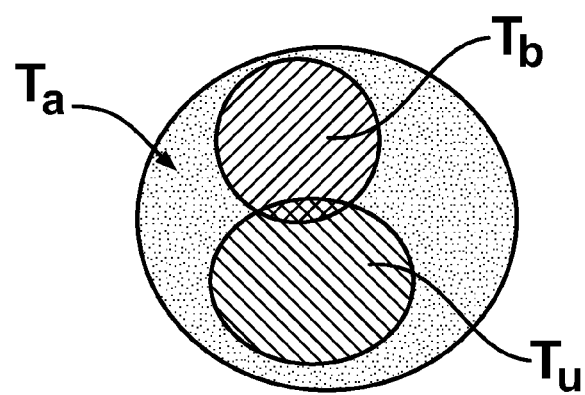
FIG. 8 Simplified Two-zone Combustion Model

AFTERTREATMENT DEVICE NOX CONVERSION EFFICIENCY DIAGNOSTICS USING ON BOARD ADAPTIVE DIAGNOSTIC ALGORITHM

CROSS REFERENCE TO RELATED APPLICATIONS

This application claims the benefit of U.S. Provisional Application No. 61/090,041 filed on Aug. 19, 2008 which is hereby incorporated herein by reference.

TECHNICAL FIELD

This disclosure is related to control of aftertreatment of NOx emissions in internal combustion engines.

BACKGROUND

The statements in this section merely provide background information related to the present disclosure and may not constitute prior art.

Emissions control is an important factor in engine design and engine control. NOx, is a known by-product of combustion. NOx is created by nitrogen and oxygen molecules present in engine intake air disassociating in the high temperatures of combustion, and rates of NOx creation include known relationships to the combustion process, for example, with higher rates of NOx creation being associated with higher combustion temperatures and longer exposure of air molecules to the higher temperatures. Reduction of NOx created in the combustion process and management of NOx in an exhaust aftertreatment system are priorities in vehicle design.

NOx molecules, once created in the combustion chamber, can be converted back into nitrogen and oxygen molecules in exemplary devices known in the art within the broader category of aftertreatment devices. However, one having ordinary skill in the art will appreciate that aftertreatment devices are largely dependent upon operating conditions, such as device operating temperature driven by exhaust gas flow temperatures.

Modern engine control methods utilize diverse operating strategies to optimize combustion. Some operating strategies, optimizing combustion in terms of fuel efficiency, include lean, localized, or stratified combustion within the combustion chamber in order to reduce the fuel charge necessary to achieve the work output required of the cylinder. While temperatures in the combustion chamber can get high enough in pockets of combustion to create significant quantities of NOx, the overall energy output of the combustion chamber, in particular, the heat energy expelled from the engine through the exhaust gas flow, can be greatly reduced from normal values. Such conditions can be challenging to exhaust aftertreatment strategies, since, as aforementioned, aftertreatment devices frequently require an elevated operating temperature, driven by the exhaust gas flow temperature, to operate adequately to treat NOx emissions.

Aftertreatment devices are known, for instance, utilizing catalysts capable of storing some amount of NOx, and engine control technologies have been developed to combine these NOx traps or NOx adsorbers with fuel efficient engine control strategies to improve fuel efficiency and still achieve acceptable levels of NOx emissions. One exemplary strategy includes using a lean NOx trap to store NOx emissions during fuel lean operations and then purging the stored NOx during fuel rich, higher temperature engine operating conditions with conventional three-way catalysis to nitrogen and water. Such purging events or regeneration events can be the result of changing vehicle operation or forced purging events. A forced purging event requires monitoring the amount of NOx stored and some mechanism or criteria to initiate the purge. For example, a NOx trap has a limited storage capacity, and sensors can be used in the exhaust gas flow to estimate NOx creation in order to estimate the NOx trap state. Once the NOx trap gets close to its full capacity, it must be regenerated with a fuel rich reducing "pulse". It is desirable to control the efficiency of the regeneration event of the NOx trap to provide optimum emission control and minimum fuel consumption. Various strategies have been proposed.

Techniques are known for adsorbing NOx (trapping) when the air-fuel ratio of the exhaust gas flowing into the NOx adsorbent is lean and releasing the adsorbed NOx (regenerating) when the air-fuel ratio of the exhaust gas flowing into the NOx adsorbent becomes rich wherein the amount of NOx adsorbed in the NOx adsorbent may be estimated from the engine load and the engine rotational speed. When the amount of the estimated NOx becomes the maximum NOx adsorption capacity of the NOx adsorbent, the air-fuel ratio of the exhaust gas flowing into the NOx adsorbent is made rich. Determination of a regeneration phase may also be on the basis of individual operating cycles of the internal combustion engine.

It is also known to estimate how full the NOx trap is by estimating the amount of NOx flowing into the NOx trap using a NOx sensor or a pre-NOx trap oxygen sensor. It is also known to schedule regeneration based on estimations of accumulated NOx mass and engine load and speed operating condition probabilities.

Increasingly stringent emission standards require NOx aftertreatment methods, utilizing, for example, a selective catalytic reduction device (SCR). An SCR utilizes ammonia derived from urea injection or recovered from normal operation of a three-way catalyst device to treat NOx. Additionally, it is known to operate a diesel oxidation catalyst (DOC) upstream of the SCR in diesel applications to convert NO into $NO_2$ preferable to treatment in the SCR. Continued improvement in exhaust aftertreatment requires accurate information regarding NOx emissions in the exhaust gas flow in order to achieve effective NOx reduction, such as dosing proper amount of urea based on monitored NOx emissions.

Aftertreatment devices such as lean NOx traps and SCRs convert NOx to other constituents at some conversion efficiency. Conversion efficiency can be described by the flow of NOx flowing into a device versus the flow of NOx exiting the device. An aftertreatment device operating properly experiences reduced efficiency according to properties of the exhaust gas flow that affect the chemical reaction occurring in the device. For example, temperature and space velocity of the gases within a NOx trap affect the efficiency of the device. Temperature and space velocity of the gases within an SCR device similarly affect the efficiency of the device. These environmental factors can be monitored in the aftertreatment system, and effects of these factors upon device conversion efficiency can be estimated. Additionally, malfunctions or degraded performance caused by wear or damage can reduce the efficiency of the aftertreatment device. A method to distinguish degraded performance based upon transient environmental conditions from a malfunctioning or damaged aftertreatment device would be beneficial to diagnosing a malfunction condition in the device.

SUMMARY

A powertrain includes an internal combustion engine and an aftertreatment system having an aftertreatment device utilizing a catalyst to convert NOx. A method for indicating a malfunctioning catalyst includes monitoring an actual NOx content exiting the aftertreatment system, monitoring factors affecting conversion efficiency of the aftertreatment device, determining a predicted threshold NOx content exiting the aftertreatment system for an exemplary malfunctioning catalyst based upon the factors affecting conversion efficiency, comparing the actual NOx content exiting the aftertreatment system to the predicted threshold NOx content exiting the aftertreatment system, and indicating a malfunctioning catalyst based upon the comparing.

BRIEF DESCRIPTION OF THE DRAWINGS

One or more embodiments will now be described, by way of example, with reference to the accompanying drawings, in which:

FIG. 6 graphically illustrates an exemplary mass fraction burn curve in accordance with the present disclosure;

FIG. 7 graphically illustrates an exemplary cylinder pressure plotted against crank angle through a combustion process, in accordance with the present disclosure;

FIG. 8 depicts a number of different temperatures capable of estimation within the combustion chamber important to describing the combustion process, in accordance with the present disclosure;

DETAILED DESCRIPTION

Figure 1:
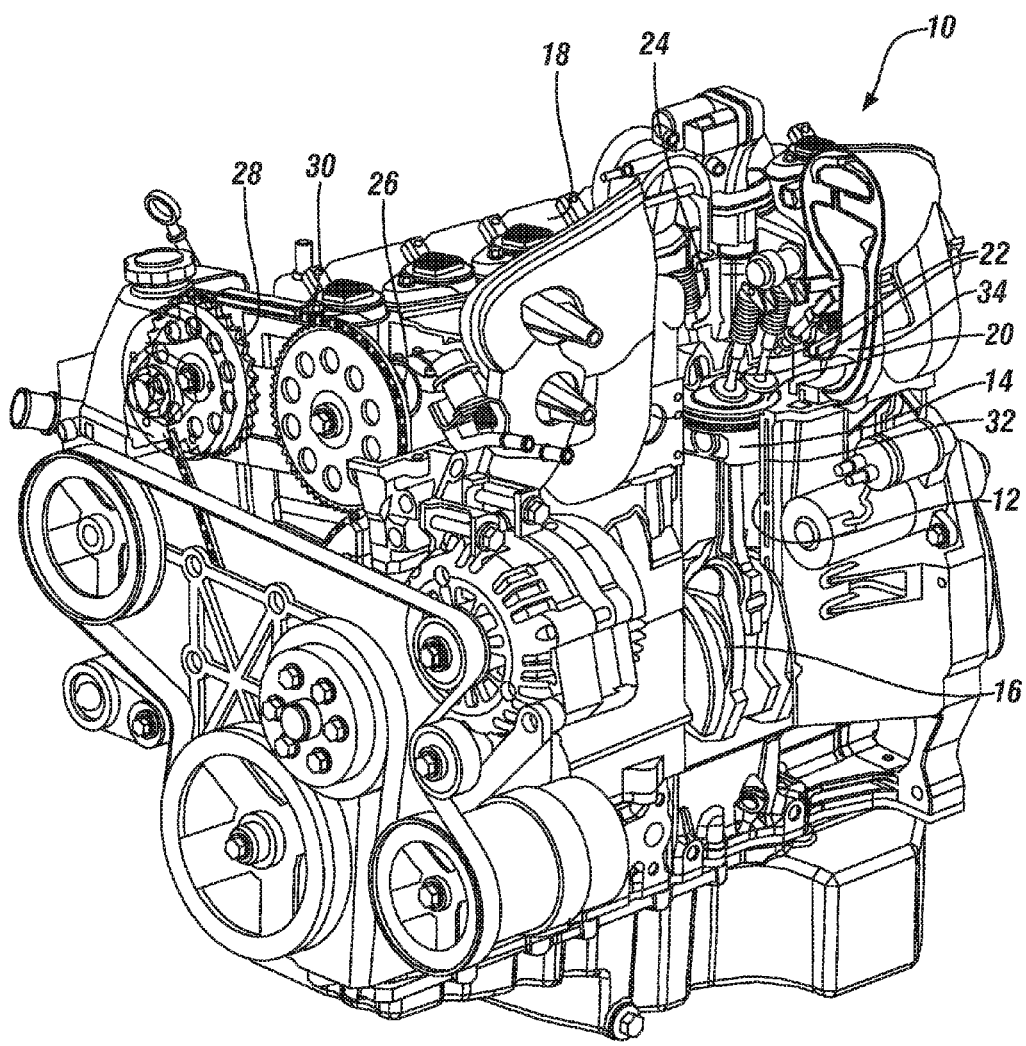
FIG. 1 schematically depicts an exemplary diesel engine, in accordance the present disclosure.

Referring now to the drawings, wherein the showings are for the purpose of illustrating certain exemplary embodiments only and not for the purpose of limiting the same, FIG. 1 is a sectional representation of an exemplary diesel engine, in accordance with the present disclosure. Engine 10 conventionally includes a plurality of cylinders 12 having therein reciprocable pistons 14 connected with a crankshaft 16. This disclosure is generally applicable to direct injection four-stroke compression ignition engines. The ends of the cylinder are closed by a cylinder head 18 so that the cylinders and pistons define variable volume combustion chambers 20.

The cylinder head is provided with intake valves 22 which control the timing and flow of intake air into the cylinders during intake strokes of the pistons. Exhaust valves 24 in the cylinder head control timing and flow of exhaust products from the combustion chambers during exhaust strokes of the pistons. In the engine shown there are two intake valves and two exhaust valves for each cylinder, however, any suitable number of valves provided for operation of the engine may be utilized in accordance with the disclosure.

The intake and the exhaust valves are actuated by separate valve actuation devices 26, 28. The valve actuation devices exclusively operate their respective intake and exhaust valves, however, both are driven by the crankshaft 16 through a timing chain 30.

The exemplary engine 10 includes a cast-metal engine block with a plurality of cylinders formed therein and an engine head. The engine block preferably includes coolant passages 32 through which engine coolant fluid passes. A coolant temperature sensor, operable to monitor temperature of the coolant fluid, is located at an appropriate location, and provides a signal input to a control system indicative of engine operating temperature useful in engine control. The engine preferably includes known systems including an external exhaust gas recirculation (EGR) valve and an intake air throttle valve (not shown).

Each piston 14 is connected via a pin and connecting rod to the crankshaft 16. The crankshaft 16 is rotatably attached to the engine block at a main bearing area near a bottom portion of the engine block, such that the crankshaft is able to rotate around an axis that is perpendicular to a longitudinal axis defined by each cylinder. A crank sensor (not shown) is placed in an appropriate location, operable to generate a signal that is useable by the controller to measure crank angle, and which is translatable to provide measures of crankshaft rotation, speed, and acceleration that are useable in various control schemes. During operation of the engine, each piston 14 moves up and down in the cylinder in a reciprocating fashion due to connection to and rotation of the crankshaft 16, and the combustion process. The rotation action of the crankshaft effects translation of linear force exerted on each piston during combustion to an angular torque output from the crankshaft, which can be transmitted to another device, e.g. a vehicle driveline.

The engine head comprises a cast-metal device having one or more intake ports and one or more exhaust ports which flow to the combustion chamber 20. The intake port supplies air to the combustion chamber 20. Combusted (burned) gases flow from the combustion chamber 20 via the exhaust port. Flow of air through each intake port is controlled by actuation of one or more intake valves 22. Flow of combusted gases through each exhaust port is controlled by actuation of one or more exhaust valves 24.

The intake and exhaust valves 22, 24 each have a head portion that includes a top portion that is exposed to the combustion chamber. Each of the valves 22, 24 has a stem that is connected to a valve actuation device. A valve actuation device 26 is operative to control opening and closing of each of the intake valves 22, and a second valve actuation device 28 operative to control opening and closing of each of the exhaust valves 24. Each of the valve actuation devices 26, 28 comprises a device signally connected to the control system and operative to control timing, duration, and magnitude of opening and closing of each valve, either in concert or individually. One embodiment of the exemplary engine comprises a dual overhead cam system which has variable lift control (VLC) and variable cam phasing (VCP) devices as part of the valve actuation devices 26, 28. VCP devices are operative to control timing of opening or closing of each intake valve and each exhaust valve relative to rotational position of the crankshaft and opens each valve for a fixed crank angle duration. VLC devices are operative to control magnitude of valve lift to one of two positions: one position to 3-5 mm lift for an open duration of 120-150 crank angle degrees, and another position to 9-12 mm lift for an open duration of 220-260 crank angle degrees. Individual valve actuation devices can serve the same function to the same effect. The valve actuation devices are preferably controlled by the control system according to predetermined control schemes. Alternative variable valve actuation devices including, for example, fully flexible electrical or electro-hydraulic devices may also be used and have the further benefit of independent opening and closing phase control as well as substantially infinite valve lift variability within the limits of the system. A specific aspect of a control scheme to control opening and closing of the valves is described herein.

Air is inlet to the intake port through an intake manifold runner 34, which receives filtered air passing through a known air metering device and a throttle device (not shown). Exhaust gas passes from the exhaust port to an exhaust manifold, which includes exhaust gas sensors operative to monitor constituents of the exhaust gas flow, and determine parameters associated therewith. The exhaust gas sensors can comprise any of several known sensing devices operative to provide values for the exhaust gas flow, including air/fuel ratio, or measurement of exhaust gas constituents, e.g. NOx, CO, HC, and others. The system may include an in-cylinder sensor for monitoring combustion pressures, or non-intrusive pressure sensors or inferentially determined pressure determination (e.g. through crankshaft accelerations). The aforementioned sensors and metering devices each provide a signal as an input to the control system. These inputs can be used by the control system to determine combustion performance measurements.

The control system preferably comprises a subset of an overall control architecture operable to provide coordinated system control of the engine 10 and other systems. In overall operation, the control system is operable to synthesize operator inputs, ambient conditions, engine operating parameters, and combustion performance measurements, and execute algorithms to control various actuators to achieve targets for control parameters, including such parameters as fuel economy, emissions, performance, and drivability. The control system is operably connected to a plurality of devices through which an operator controls or directs operation of the engine. Exemplary operator inputs include an accelerator pedal, a brake pedal, transmission gear selector, and vehicle speed cruise control when the engine is employed in a vehicle. The control system may communicate with other controllers, sensors, and actuators via a local area network (LAN) bus (not shown) which preferably allows for structured communication of control parameters and commands between various controllers.

The control system is operably connected to the engine 10, and functions to acquire data from sensors, and control a variety of actuators of the engine 10 over appropriate interfaces. The control system receives an engine torque command, and generates a desired torque output, based upon the operator inputs. Exemplary engine operating parameters that are sensed by control system using the aforementioned sensors include engine coolant temperature, crankshaft rotational speed (RPM) and position, manifold absolute pressure, ambient air flow and temperature, and ambient air pressure. A sensor capable of monitoring crankshaft rotational position can be utilized to monitor or determine a progression of the engine and various cylinders through various stages of a combustion cycle. Combustion performance measurements may comprise measured and inferred combustion parameters, including air/fuel ratio, location of peak combustion pressure, among others.

Actuators controlled by the control system include: fuel injectors (not shown); the VCP/VLC valve actuation devices 26, 28; EGR valve (not shown), and, electronic throttle control module (not shown). Fuel injectors are preferably operable to inject fuel directly into each combustion chamber 20.

The control system preferably comprises a general-purpose digital computer generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. Each controller has a set of control algorithms, comprising resident program instructions and calibrations stored in ROM.

Algorithms for engine control may be executed during preset loop. Algorithms stored in the non-volatile memory devices are executed by the central processing unit and are operable to monitor inputs from the sensing devices and execute control and diagnostic routines to control operation of the engine, using preset calibrations. Loop cycles may be executed at regular intervals, for example each 3.125, 6.25, 12.5, 25 and 100 milliseconds during ongoing engine operation. Alternatively, algorithms may be executed in response to occurrence of an event or interrupt request.

FIG. 1 describes an exemplary diesel engine. However, it will be appreciated that NOx treatment and aftertreatment systems are utilized in other engine configurations including gasoline engines, and the disclosure is not intended to be limited to the specific exemplary engine embodiment described herein.

Figure 2:
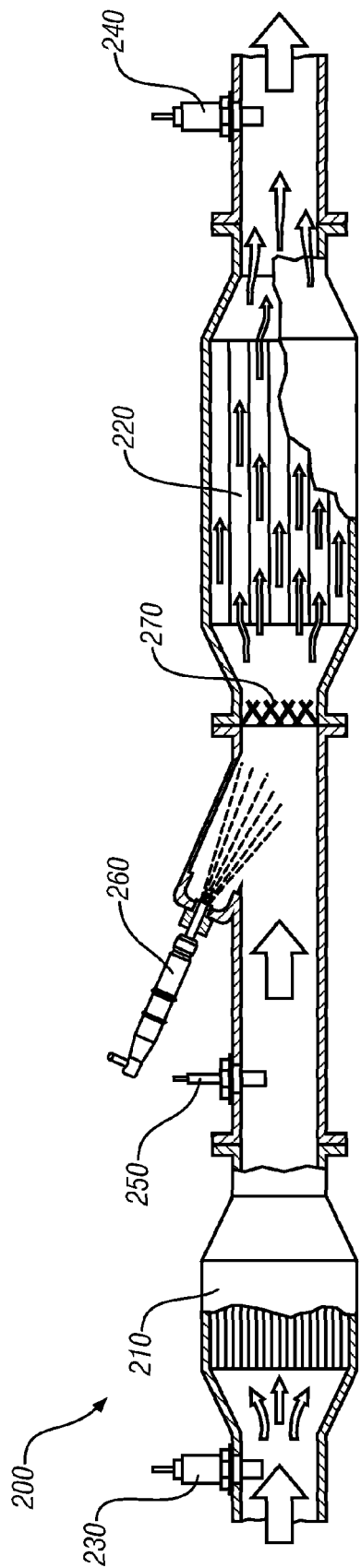
FIG. 2 schematically depicts an exemplary aftertreatment system, in accordance with the present disclosure.

FIG. 2 schematically illustrates an exemplary aftertreatment system, in accordance with the present disclosure. Aftertreatment system 200 comprises DOC 210, SCR 220, upstream NOx sensor 230, downstream NOx sensor 240, temperature sensor 250, and urea dosing module 260. DOC 210 performs a number of catalytic functions necessary to aftertreatment of an exhaust gas flow. One of the functions of DOC 210 is to convert NO, a NOx form not easily treated in an SCR, into $NO_2$, a NOx form easily treated in an SCR. SCR 220 utilizes urea as a reactant to reduce NOx into other constituents. Upstream NOx sensor 230 detects and quantifies NOx in the exhaust gas flow entering aftertreatment system 200. While upstream NOx sensor 230 is illustrated as an exemplary means to quantify NOx entering the aftertreatment system, it should be noted that NOx entering the system can be quantified for use in evaluating conversion efficiency in an SCR by other means, for example, through a NOx sensor located between DOC 210 and SCR 220 or through a virtual NOx sensor modeling engine output and conditions within the exhaust gas flow to estimate the presence of NOx entering the aftertreatment system. This disclosure in general discusses a sensor input describing NOx entering the aftertreatment system in accordance with the exemplary embodiment, however it will be appreciated that, depending upon upstream sensor placement, the input could actually describe NOx content entering a portion of the aftertreatment system. SCR 220 utilizes ammonia, for example, as derived from injected urea, to convert NOx to other constituents by methods known in the art. Temperature sensor 250 is depicted, located in a region to gather exhaust gas flow temperatures within the aftertreatment system 200. Urea dosing module 260 is depicted in a position upstream of SCR 220. The urea can be directly sprayed into the exhaust gas flow entering the SCR. However, a preferred method is depicted, utilizing a mixer device 270. Urea dosing module 260 injects urea onto mixer device 270, and the urea is then carried by the exhaust gas flow in a substantially even distribution onto the catalyst surfaces on the interior of SCR 220. Downstream NOx sensor 240 detects and quantifies NOx in the exhaust gas flow exiting aftertreatment system 200. A method is disclosed to utilize a measure of the NOx entering the aftertreatment system and a measure of the NOx exiting the aftertreatment system to determine the conversion efficiency of the NOx into other constituents within aftertreatment devices.

Conversion efficiency is described as the efficiency with which an aftertreatment device can convert NOx into other constituents. The exemplary aftertreatment system described above describes a measured or estimated NOx content of the exhaust gas flow measured upstream of the aftertreatment device being analyzed. This measure of NOx entering the aftertreatment system can be described at any time t as $x(t)$. The exemplary aftertreatment system described above describes a measured or estimated NOx content of the exhaust gas flow measured downstream of the aftertreatment device being analyzed. This measure of NOx exiting the aftertreatment system can be described at any time as $y(t)$. Conversion efficiency at any given time by the following equation:

$$\eta_{ACTUAL}(t) = 1 - \frac{y(t)}{x(t)} \quad [1]$$

It will be appreciated that this equation provides the conversion efficiency at any instant in time. Such instantaneous measurements or calculations are prone to error based upon signal noise. Methods to apply a low pass filter are known in the art. An integration of $x(t)$ or $y(t)$ yields a description of a quantity of actual NOx to enter or exit the aftertreatment system through a time period, respectively. An exemplary equation to determine an integrated conversion efficiency, filtering anomalous measurements in $x(t)$ and $y(t)$, can be described as follows:

$$\eta_{ACTUAL} = 1 - \frac{\int y(t)*dt}{\int x(t)*dt} \quad [2]$$

In this way, measured or estimated values of NOx entering and exiting the aftertreatment system can be utilized to determine an estimated or calculated actual conversion efficiency of the aftertreatment system.

A properly operating or fresh aftertreatment device operates with some maximum achievable conversion efficiency for a given set of conditions. However, it will be appreciated that aftertreatment devices, particularly devices utilizing a catalyst, are subject to degraded performance over time and in particular with exposure to high temperatures.

Conversion efficiency in a fresh device is affected by a number of environmental or operational factors. Conversion efficiency for an exemplary SCR can be determined by a model expressed by the function:

$$\eta = f(T_{BED}, SV, \theta_{NH_3}, x(t), V_{UREA}, \rho_{CELL}) \quad [3]$$

$T_{BED}$ describes the temperature of the catalyst bed within the SCR. This temperature can be directly measured or can be estimated based upon temperature, flow rate, and other properties of the exhaust gas flow. SV describes the surface velocity of exhaust gas flowing through the SCR device and can be determined as a function of properties of the exhaust gas flow, including temperature and flow rate. $\theta_{NH_3}$ describes an amount of ammonia storage on the catalyst bed, and adequate presence of ammonia on the SCR is required to achieve the desired NOx conversion reaction. $\theta_{NH_3}$ can be estimated, for example, by analyzing ammonia adsorbtion and desorbtion rates, NOx conversion rates, and adsorbed ammonia oxidation rates. As described above, $x(t)$ describes the presence of NOx in the exhaust gas flow entering the aftertreatment system. Low levels of NOx are easily reacted within a properly functioning SCR, while levels of NOx above a certain threshold are more difficult to react and correspond to lower conversion efficiencies. An example of a factor limiting treatment of NOx above certain quantities includes limited ammonia present in an SCR. $V_{UREA}$ describes the volume of urea injected. While $V_{UREA}$ describes a presence of ammonia similarly to $\theta_{NH_3}$, $V_{UREA}$ includes a present measure of urea being injected and can better describe transient indicator for ammonia expected to be present in the near future. $\rho_{CELL}$ describes the density of catalyst material within the SCR and, therefore, describes a capacity of the SCR to catalyze the intended reaction.

The above model describing conversion efficiency includes factors which can be assumed or confirmed in normal operation of an SCR. As a result, the model can be simplified, thereby reducing a processing load required to analyze conversion efficiency through the model. For example, a $V_{UREA}$ can be monitored through operation of the urea dosing module, and given $V_{UREA}$ values in a particular intended range, the resulting conversion efficiency calculations should remain unaffected. In some embodiments, $V_{UREA}$ is controlled to be substantially directly proportional to $x(t)$. Additionally, $\theta_{NH_3}$ can in some embodiments be estimated based upon $V_{UREA}$, monitored characteristics of the exhaust gas flow and of the SCR, such as temperature, and $x(t)$. Given $\theta_{NH_3}$ values in a normal range, $\theta_{NH_3}$ can be reduced to a portion of the functional model dependent upon $T_{BED}$. A value for $x(t)$, as described above, can be monitored through an upstream NOx sensor or a virtual NOx sensor. $\rho_{CELL}$ is a characteristic of the SCR device and is a known value. As a result of these known or estimable factors, a nominal conversion efficiency for an exemplary fresh or ideal SCR can be determined by a model expressed by the function:

$$\eta_{NO} = f(T_{BED}, SV, \theta_{NH_3}) \quad ([4])$$

In this way, conversion efficiency of the SCR can be accurately determined as an on board diagnostic function by maintaining other factors within known or calibrated ranges.

The above factors are used to describe or estimate conversion efficiency of the chemical reaction taking place within the SCR. It will be appreciated that similar expressions can be utilized to describe conversion reactions occurring within other aftertreatment devices. For example, a lean NOx trap with known geometric and catalytic properties, depending primarily upon a temperature within the device and the speed at which exhaust gas is flowing through the device, operates in regeneration cycles to convert adsorbed NOx into other constituents. A nominal conversion efficiency for an exemplary fresh lean NOx can be determined by a model expressed by the following function:

$$\eta_{NO} = f(T_{BED}, SV) \quad [5]$$

Because a lean NOx trap does not depend upon injection of any reactant, such as urea in an SCR, conversion efficiency of the lean NOx trap can be accurately determined as an on board diagnostic function by monitoring temperature and space velocity.

Based upon the above models or other models known in the art for a particular aftertreatment device, a conversion efficiency for a fresh aftertreatment device can be estimated or predicted. A malfunction conversion efficiency for a device under given operating conditions can be calibrated based upon test data or can be set as a fraction of an estimated conversion efficiency of a fresh device. A degree of degraded conversion efficiency indicating that the aftertreatment device is not operating properly may be developed experimentally, empirically, predictively, through modeling or other techniques adequate to accurately predict aftertreatment device operation, and a multitude of malfunction conversion efficiencies might be used by the same aftertreatment device for different conditions or operating ranges. Subject to the assumptions described above, a malfunction conversion efficiency ($\eta_{malf\_predicted}$) for an SCR can be expressed by the following function:

$$\eta_{malf\_predicted} = f(T_{BED}, SV, \theta_{NH_3}) \quad [6]$$

In this case, the malfunction conversion efficiency can be expressed as a function of the temperature within the device, the speed of the exhaust gases flowing through the device, and the amount of ammonia storage. A similar $\eta_{malf\_predicted}$ term for a lean NOx trap can be described by the following equation:

$$\eta_{malf\_predicted} = f(T_{BED}, SV) \quad [7]$$

Such functions can be defined or mapped by test data or calibrated values known to indicate a malfunction catalyst for given input conditions. Such a functional relationship can be available within the vehicle as a look-up table stored in device memory, a computerized model based upon the functional relationship, or any other method known in the art. Alternatively, given a known acceptable or nominal conversion efficiency that should result from within a fresh device ($\eta_{NO}$) under current conditions, a calibratable threshold factor (A) can be utilized to indicate a malfunction in the device. An exemplary equation that can be utilized to describe a malfunction conversion efficiency is expressed by the following:

$$1 - \eta_{malf\_predicted} = A^*(1 - \eta_{NO}) \quad [8]$$

Solving this equation for $\eta_{malf\_predicted}$ yields the following equation:

$$\eta_{malfpredicted} = 1 - A^*(1 - \eta_{NO}) \quad [9]$$

A can be dynamically set during operation of the powertrain based upon factor affecting conversion efficiency in the aftertreatment device. An exemplary method to set A can set the value based upon SV and $T_{BED}$. A value for A can be calculated utilizing a functional relationship during operation, or a value can be determined from a look-up table based upon predetermined calculations or data. Using either of the above exemplary methods, a malfunction conversion efficiency can be utilized to determine a conversion efficiency value indicating a malfunction in an aftertreatment device under a set of operating conditions.

The above methods utilize a malfunction conversion efficiency to indicate a malfunction catalyst. It will be appreciated that a similar method can be utilized according to a nominal efficiency and a decreased efficiency term, avoiding the use of a malfunction efficiency term. However, one will appreciate that such a method is a simple rearrangement of Equation 8, solving for the difference between the $\eta_{NO}$ and $\eta_{malf\_predicted}$ terms. In this way, predictive methods described herein can be utilized to indicate a malfunction catalyst by determining the difference between $\eta_{NO}$ and $\eta_{ACTUAL}$ and indicating the malfunction catalyst if the difference is more than a determined threshold.

Figure 3:
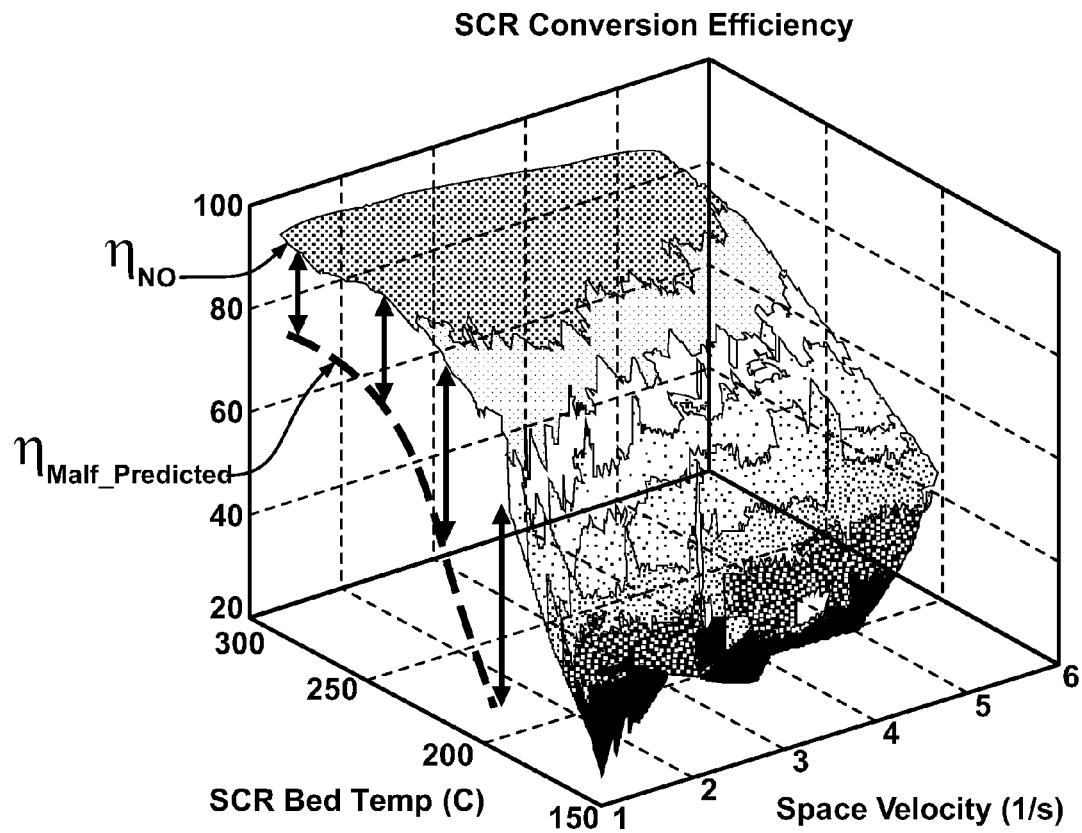
FIG. 3 graphically illustrates exemplary test data relating conversion efficiency to catalyst bed temperature and space velocity in an exemplary SCR, in accordance with the present disclosure.
Figure 5:
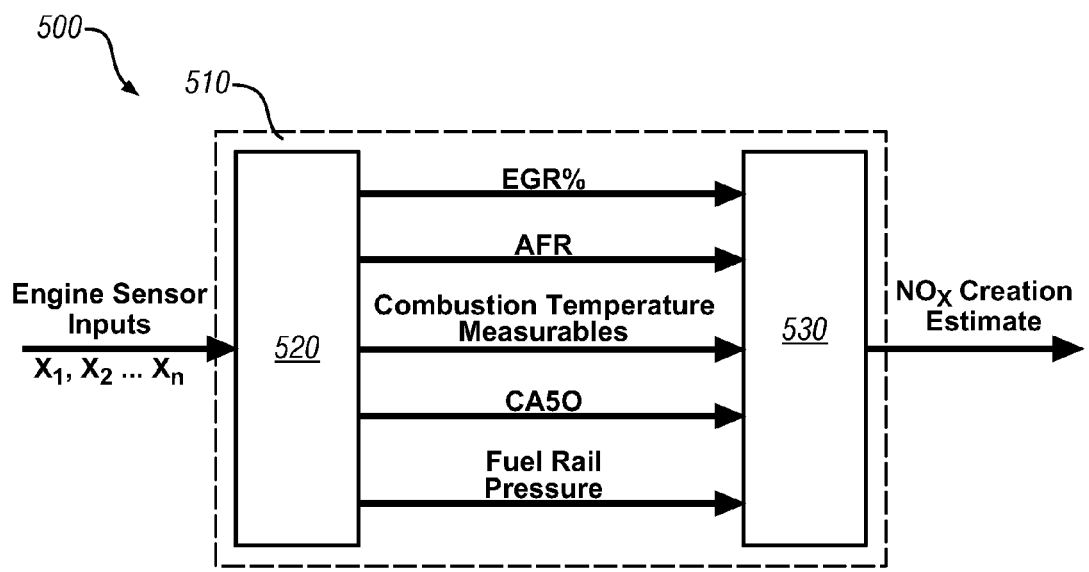
FIG. 5 schematically depicts an exemplary NOx model module, utilized within an engine control module and determining an NOx creation estimate, in accordance with the present disclosure.

FIG. 3 graphically illustrates exemplary test data relating conversion efficiency to catalyst bed temperature and space velocity in an exemplary SCR, in accordance with the present disclosure. The three-dimensionally projected surface describes conversion efficiency within an exemplary fresh SCR. In a two-dimensional plane wherein SV equals one, an exemplary data curve is depicted illustrating behavior of a malfunction catalyst. Utilizing such test data or exemplary data gathered in a vehicle through normal operation, a comparison of measured conversion efficiency to nominal conversion efficiency can yield a determination of a malfunction catalyst within an aftertreatment device.

As described above an integration of x and y terms can utilized to apply a low pass filter in determining an actual conversion efficiency. A similar method can be employed in determining a malfunction conversion efficiency. Utilizing a known or predicted behavior of a device, utilizing data such as described in FIG. 3 to generate a predicted malfunction conversion efficiency, and monitoring an x(t) input, a predicted $y_{malf}(t)$ can be described based upon current operating conditions. An exemplary embodiment of an equation describing this prediction can be expressed as follows:

$$y_{malf}(t) = (1 - \eta_{malf\_predicted}) * x(t) \quad [10]$$

By integrating this term through a time period, a threshold total NOx exiting the aftertreatment can be described as $\int y_{malf}(t)^*dt$. By comparing measured or actual NOx exiting from the aftertreatment system to this threshold term, an indication of a malfunction catalyst can be performed. Additionally, a filtered $\eta_{malf\_predicted}$ term can be determined. This calculation can be expressed as follows:

$$\eta_{malf\_predicted\_filtered} = 1 - \frac{\int y_{malf}(t) * dt}{\int x(t) * dt} \quad [11]$$

This term yields a predicted conversion efficiency that a threshold malfunctioning catalyst would exhibit with given x(t) values through a time period based upon $\eta_{malf\_predicted}$ from a model predicting device behavior.

The above methods compare conversion efficiencies to identify a malfunction catalyst. Alternative methods are disclosed to indicate a malfunction catalyst, for example, based upon comparing a predicted NOx content exiting the aftertreatment system to an actual NOx content exiting the aftertreatment system. By comparing $y_{malf}(t)$ to y(t), an evaluation can be made at time t whether the catalyst is functioning properly. In order to improve the estimation and filter out effects of noise, known methods to analyze $y_{malf}(t)$ and y(t) can be used to evaluate the catalyst. For example, multiple comparisons of the terms can be stored and statistically analyzed. In another example, the terms can be integrated over a period of time and compared. In one exemplary embodiment utilizing integration to compare the terms, a factor A as described in association with Equation 8 can be utilized to determine a $\eta_{malf\_predicted}$ term in relation to a known $\eta_{NO}$ value. This relationship can be rearranged into the following equation:

$$A = \frac{1 - \eta_{malf\_predicted}}{1 - \eta_{NO}} \quad [12]$$

A rearrangement of Equation 9 and an equivalent expression of $\eta_{NO}$ and an integration of $y_{NO}(t)$ values, fed into Equation 10, yield the following equation:

$$A = \frac{\int y_{malf}(t)*dt}{\int x(t)*dt} \div \frac{\int y_{NO}(t)*dt}{\int x(t)*dt} = \frac{\int y_{malf}(t)*dt}{\int y_{NO}(t)*dt} \qquad [13]$$

The term $y_{NO}(t)$ can be estimated based upon the models described by Equations 3, 4 or 5 and x(t). Based upon Equation 13, given a calibrated A value and a predicted integration of $y_{NO}(t)$ through a time period, a predicted threshold value for an integration of $y_{malf}(t)$ can be determined describing a quantity of NOx exiting the aftertreatment system in a malfunctioning catalyst (dividing $\int y_{NO}(t)*dt$ by A yields $\int y_{malf}(t)*dt$). By comparing a measure of actual NOx exiting the aftertreatment system, or $\int y(t)*dt$, to a predicted threshold NOx exiting the aftertreatment system for malfunction catalyst, or $\int y_{malf}(t)*dt$, a determination can be made whether the catalyst being monitored is malfunctioning.

As described above, methods can be employed utilizing $\eta_{NO}$ and a determined drop in conversion efficiency in place of $\eta_{malf\_predicted}$. Similarly, a method is disclosed to indicate a malfunction catalyst based upon comparing a $y_{NO}$ term to a $y_{ACTUAL}$ term, and indicating the malfunction catalyst based upon $y_{ACTUAL}$ being greater than $y_{NO}$ by more than a threshold NOx content above nominal. The threshold NOx content above nominal value can be developed experimentally, empirically, predictively, through modeling or other techniques adequate to accurately predict operation of the aftertreatment system, and value can be dynamically determined, for example, based upon catalyst bed temperature and space velocity within the device. The $y_{NO}$ term can be calculated, for example, by the following equation determined similarly to Equation 10:

$$y_{NO}(t)=(1-\eta_{NO})*x(t) \qquad [14]$$

A comparison utilizing this term can be performed using each of $y_{NO}$ and $y_{ACTUAL}$ integrated or filtered through a time period according to methods described herein.

The above determinations of terms, including predicted conversion efficiency and nominal conversion efficiency, as described above, are dependent upon terms affecting conversion efficiency. Determinations can be calculated in real time based upon programmed functional relationships resulting from calibration results, predictive models, or any other method sufficient to predict operation of the aftertreatment system. Additionally or alternatively, some or all of the functional relationships can be embodied in look-up tables, wherein factors affecting conversion efficiency are used as inputs to the look-up tables. Other factors, such as $y_{malf}(t)$, can similarly be calculated or stored in look-up tables according to methods described herein.

Figure 4:
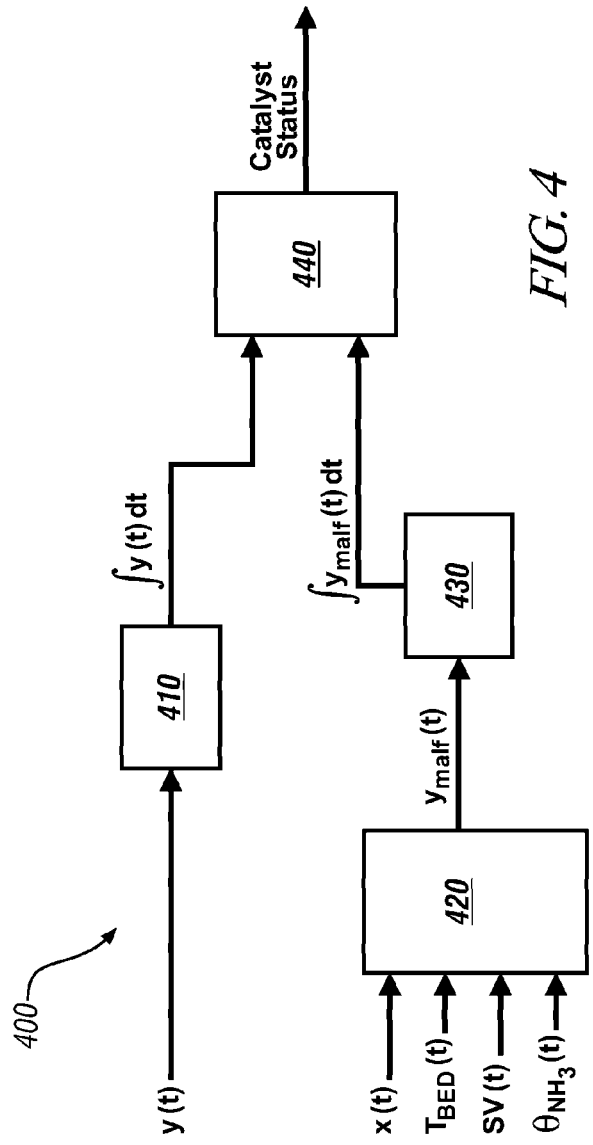
FIG. 4 illustrates an exemplary information flow diagnosing a malfunction catalyst through methods described herein, in accordance with the present disclosure.

Utilizing the above methods to determine an actual NOx exiting the aftertreatment system and to determine a predicted threshold NOx exiting the aftertreatment system for malfunction catalyst can be utilized together to diagnose a malfunction catalyst in an aftertreatment device. If the actual NOx exiting the aftertreatment system is greater than the predicted threshold NOx exiting the aftertreatment system for malfunction catalyst for current operating conditions, then a malfunction catalyst can be indicated. FIG. 4 illustrates an exemplary information flow diagnosing a malfunction catalyst through methods described herein, in accordance with the present disclosure. Information flow 400 comprises an actual NOx determination module 410, a conversion efficiency model module 420, an integrated diagnostic threshold module 430, and a comparator module 440. Actual NOx determination module 410 monitors y(t), describing NOx exiting an aftertreatment system. Integrating y(t), a $\int y(t)*dt$ term is determined. Simultaneously, conversion efficiency model module 420 monitors inputs regarding x(t), $T_{BED}(t)$, SV(t), and $\theta_{NH_3}(t)$ and applies a calibrated model describing conversion efficiency $\eta_{malf\_predicted}$ for a malfunction device. $\eta_{malf\_predicted}$ can be determined by methods described herein. A $y_{malf}(t)$ term, describing a NOx exiting the aftertreatment system term that would indicate a catalyst malfunction calculated according to exemplary Equation 10, is developed and output from module 420 to integrated diagnostic threshold module 430. Integrated diagnostic threshold module 430 applies an integration of $y_{malf}(t)$ through a time period according to Equation 9 and outputs a $\int y_{malf}(t)*dt$ term. $\int y(t)*dt$ and $\int y_{malf}(t)*dt$ are compared in comparator module 440. If $\int y(t)*dt$ is less than $\int y_{malf}(t)*dt$ then the catalyst is determined to be in a normal state. If $\int y(t)*dt$ is greater than $\int y_{malf}(t)*dt$ then the catalyst is determined to be a malfunction catalyst, and a malfunction indication is generated. This determination can be made continuously, at recurring intervals, or can be initiated upon certain events like an engine start-up event.

The method described in association with FIG. 4 includes x(t) or a measure of NOx entering the aftertreatment system. However, it should be noted that this term is utilized to generate an accurately predicted $y_{malf}(t)$ term for later integration. In the event that the x(t) term is unavailable or determined to be unreliable, an alternative estimation of $y_{malf}(t)$ or $\int y_{malf}(t)*dt$ can otherwise be determined for comparison to $\int y(t)*dt$. For example, a predicted threshold NOx exiting from the aftertreatment system could be generated based upon a look-up table and certain engine operating characteristics detailing NOx production. Some of these exemplary characteristics are described below in sections detailing operation of a virtual NOx sensor, and some or all of these factors could likewise be utilized to estimate the predicted threshold term in lieu of a malfunctioning sensor.

A number of reactions in the vehicle can be undertaken in a vehicle wherein an aftertreatment device has been determined to be malfunctioning. For example, a warning can be issued to the operator, instructing the operator to schedule repair or replacement of the catalyst. A similar warning can additionally or alternatively be stored in an error log for recall by a maintenance technician or transmitted to a remote maintenance server for remote use. In another example, an indication of a malfunctioning catalyst can be used to deemphasize or disable use of an SCR device, for example, reducing the volume of urea injected in the device. Such a change in the use of the aftertreatment system can increasingly utilize other devices in the aftertreatment system or command modulation engine operation to avoid excessive breakthrough of NOx past the SCR device or slippage of unutilized ammonia. In a system wherein more than one SCR device or catalyst is utilized or available, a malfunctioning catalyst can be deselected in favor of a remaining functional catalyst. A number of reactions to a malfunction catalyst are envisioned, and the disclosure is not intended to be limited to the particular embodiments described herein.

A NOx sensor or an oxygen sensor add cost and mass to a vehicle, and such sensors frequently require a particular operating temperature range, achieved after some warm-up time, to be functional. As described above a virtual NOx sensor can be used to estimate the presence of NOx in an aftertreatment system. FIG. 7 schematically depicts an exemplary NOx model module, utilized within an engine control module and determining a NOx creation estimate, in accordance with the present disclosure. Exemplary NOx model module 500 is operated within NOx creation estimating system 510 and comprises a model module 520 and a NOx estimation module 530. Engine sensor inputs $x_1$ through $x_n$ are inputs to the NOx model module and can include a number of factors, including temperatures, pressures, engine control settings including valve and spark timings, and other readings indicative of combustion state within the combustion chamber. Model module 520 receives these inputs and applies known relationships to determine a number of parameters to describe combustion within the combustion chamber. Examples of these descriptive parameters include EGR %, the percentage of exhaust gas diverted back into the combustion chamber in order to control the control the combustion process; an air-fuel charge ratio (AFR) describing the mixture of air and fuel present in the combustion chamber; combustion temperature measurables, including, for example, either combustion burned gas temperature or average combustion temperature; a combustion timing measurable tracking the progress of combustion through a combustion process, for example CA50, a measurement of at what crank angle 50% of the mass of fuel originally present in the combustion chamber is combusted; and fuel rail pressure, indicating the pressure of fuel available to fuel injectors to be sprayed into the combustion chamber. These descriptive parameters can be used to estimate conditions present within the combustion chamber through the combustion process. As described above, conditions present within the combustion chamber affect the creation of NOx in the combustion process. These descriptive parameters can be fed to NOx estimation module 530, wherein programmed calculations utilize the descriptive parameters as inputs to generate an estimate of NOx creation due to the combustion process. However, as described above, models analyzing variable descriptive of the combustion process can include complex calculations which can take longer to calculate than required for generating real-time results, require large amounts of processing capability, and are only as accurate as the pre-programmed algorithm permits. As a result of these challenges and a need for accurate and timely information, estimation of NOx creation within an ECM as part of an aftertreatment control strategy is not preferable.

A variety of engine sensor inputs can be used to quantify parameters descriptive of the combustion process. However, combustion occurring within the engine is difficult to directly monitor. Sensors may detect and measure fuel flow and air flow into the cylinder, a sensor may monitor a particular voltage being applied to a spark plug or a processor may gather a sum of information that would predict conditions necessary to generate an auto-ignition, but these readings together are merely predictive of combustion and do not measure actual combustion results. One exemplary method measuring actual combustion results utilizes pressure measurements taken from within the combustion chamber through a combustion process. Cylinder pressure readings provide tangible readings describing conditions within the combustion chamber. Based upon an understanding of the combustion process, cylinder pressures may be analyzed to estimate the state of the combustion process within a particular cylinder, describing the combustion in terms of both combustion phasing and combustion strength. Combustion of a known charge at known timing under known conditions produces a predictable pressure within the cylinder. By describing the phase and the strength of the combustion at certain crank angles, the initiation and the progression of a particular combustion process may be described as an estimated state of combustion. By estimating the state of the combustion process for a cylinder, factors affecting NOx creation through the combustion process can be determined and made available for use in NOx creation estimation.

One known method for monitoring combustion phasing is to estimate the mass fraction burn ratio for a given crank angle based upon known parameters. The mass fraction burn ratio describes what percentage of the charge in the combustion chamber has been combusted and serves as a good estimate of combustion phasing. FIG. 6 graphically illustrates an exemplary mass fraction burn curve in accordance with the present disclosure. For a given crank angle, the curve depicted describes the estimated percentage of fuel air mixture within the charge that has been combusted for that combustion process. In order to be used as a metric of combustion phasing, it is known to identify either a particular mass fraction burn percentage of interest or a particular crank angle of interest. FIG. 6 identifies CA50% as a crank angle at which the mass fraction burn equals 50%. By examining this particular metric across a plurality of combustion processes in this cylinder or across a number of cylinders, the comparative phasing of the particular combustion processes may be described.

As described above, combustion phasing can be utilized to estimate the state of a particular combustion process. An exemplary method for monitoring combustion phasing to diagnose ineffective combustion is disclosed whereby combustion in an engine is monitored, mass fraction burn ratios are generated for each cylinder combustion process, and the combustion phasing across the cylinders are compared. If the combustion phase for one cylinder at a particular crank angle for that first cylinder differs by more than a threshold phase difference from the combustion phase for another cylinder at the same crank angle for that second cylinder, anomalous combustion can be inferred. Many sources of anomalous combustion may be diagnosed by this method. For example, if some condition causes early ignition or knocking within the combustion chamber, the cylinder pressure readings will exhibit different values than normal combustion. Additionally, fuel system injection timing faults, causing injection of the charge at incorrect timing, will cause anomalous cylinder pressure readings. Further, if a cylinder misfires or never achieves combustion, the cylinder pressure readings will exhibit different values than normal combustion. Similarly, pressure curves may be used to diagnose other abnormal combustion conditions, such as changes in the air fuel mixture, changes in camshaft phasing, and maintenance failures to related components. Any such diagnoses of combustion health have implications to NOx and can be useful to estimate NOx creation.

Many methods are known to estimate mass fraction burn. One method examines pressure data from within the combustion chamber, including analyzing the pressure rise within the chamber attributable to combustion. Various methods exist to quantify pressure rise in a cylinder attributable to combustion. Pressure ratio management (PRM) is a method based upon the Rassweiler approach, which states that mass fraction burn may be approximated by the fractional pressure rise due to combustion. Combustion of a known charge at a known time under known conditions tends to produce a consistently predictable pressure rise within the cylinder. PRM derives a pressure ratio (PR) from the ratio of a measured cylinder pressure under combustion at a given crank angle ($PCYL(\theta)$) to a calculated motored pressure, estimating a pressure value if no combustion took place in the cylinder, at a given crank angle ($PMOT(\theta)$), resulting in the following equation:

$$PR(\theta) = \frac{P_{CYL}(\theta)}{P_{MOT}(\theta)} \qquad [15]$$

FIG. 7 graphically illustrates an exemplary cylinder pressure plotted against crank angle through a combustion process, in accordance with the present disclosure. $P_{MOT}(\theta)$ exhibits a smooth, inverse parabolic peak from the piston compressing a trapped pocket of gas without any combustion. All valves are closed with the piston at BDC, the piston rises compressing the gas, the piston reaches TDC at the peak of the pressure curve, and the pressure reduces as the piston falls away from TDC. A rise in pressure above $P_{MOT}(\theta)$ is depicted by $P_{CYL}(\theta)$. The timing of combustion will vary from application to application. In this particular exemplary curve, $P_{CYL}(\theta)$ begins to rise from $P_{MOT}(\theta)$ around TDC, describing an ignition event sometime before TDC. As the charge combusts, heat and work result from the combustion, resulting in an increase in pressure within the combustion chamber. PR is a ratio of $P_{MOT}$ to $P_{CYL}$, and $P_{MOT}$ is a component of $P_{CYL}$. Net combustion pressure ($NCP(\theta)$) is the difference between $P_{CYL}(\theta)$ and $P_{MOT}(\theta)$ or the pressure rise in the combustion chamber attributable to combustion at a given crank angle. It will be appreciated that by subtracting one from PR, a ratio of NCP to $P_{MOT}$ may be determined.

$$PR(\theta) - 1 = \frac{P_{CYL}(\theta)}{P_{MOT}(\theta)} - \frac{P_{MOT}(\theta)}{P_{MOT}(\theta)} = \frac{NCP(\theta)}{P_{MOT}(\theta)} \qquad [16]$$

PR measured through the equation above therefore may be used to directly describe the strength of combustion within a cylinder. Normalizing PR minus one at crank angle $\theta$ to an expected or theoretical maximum PR value minus one yields a fractional pressure ratio of the pressure rise due to combustion at crank angle $\theta$ to the expected total pressure rise due to combustion at the completion of the combustion process. This normalization can be expressed by the following equation:

$$FPR(\theta) = \frac{PR(\theta) - 1}{PR(90°) - 1} \propto MassFractionBurn(\theta) \qquad [17]$$

This fractional pressure ratio, by equating pressure rise attributable to combustion to the progression of combustion, describes the mass fraction burn for that particular combustion process. By utilizing PRM, pressure readings from a cylinder may be used to estimate mass fraction burn for that cylinder.

The above method utilizing PRM is applicable for broad ranges of temperature, cylinder charge and timings associated with compression ignition engines, with the added benefit of not requiring calibrated pressure sensors. Because PR is a ratio of pressures, a non-calibrated linear pressure transducer may be utilized to acquire pressure data readings from each cylinder.

Another method to estimate mass fraction burn is to directly utilize the Rassweiler approach to determine mass fraction burn by calculating the total heat released for a given crank angle. The Rassweiler approach utilizes pressure readings from a cylinder to approximate the incremental heat release in the cylinder. This approach is given by the following equation:

$$Q_{Released}(\theta) = \sum P_{k+1} - P_{k-1}\left(\frac{V_{k-1}}{V_k}\right)^r \qquad [18]$$

Mass fraction burn, a measure of how much of the charge has been combusted by a certain crank angle, may be approximated by determining what fraction of heat release for a combustion process has taken place at a given crank angle. The incremental heat release determined by the Rassweiler approach may be summed over a range of crank angles, compared to the total expected or theoretical heat release for the combustion process, and utilized to estimate mass fraction burn. For example, if 75% of the total expected heat release has been realized for a given crank angle, we can estimate that 75% of the combustion for the cycle has taken place at that crank angle.

Other methods may be used to estimate mass fraction burn. One method quantifies the rate of change of energy within the combustion chamber due to combustion through an analysis of classical heat release measures based on analysis of the heat released and work performed through the combustion of the charge. Such analyses are focused on the First Law of Thermodynamics, which states that the net change on energy in a closed system is equal to the sum of the heat and work added to the system. Applied to a combustion chamber, the energy increase in the combustion chamber and the enclosed gases equals the heat transferred to the walls of the chamber and the gases plus the expansive work performed by the combustion.

An exemplary method utilizing these classic heat release measures to approximate a mass fraction burn estimate analyzes the rate of heat release by charge combustion throughout combustion process. This rate of heat release, $dQ_{ch}/d\theta$, may be integrated over a range of crank angles in order to describe the net energy released in the form of heat. Through derivations known in the art, this heat release may be expressed through the following equation:

$$Q = \int \frac{dQ_{ch}}{d\theta} = \int \left(\frac{\gamma}{\gamma - 1} p \frac{dV}{d\theta} + \frac{1}{\gamma - 1} V \frac{dp}{d\theta}\right) \qquad [19]$$

Gamma, $\gamma$, comprises a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio, $\phi$, and EGR molar fraction targeted for the operating condition and using the relation that $[\gamma=1+(R/c_v)]$, wherein R is the universal gas constant, and the weighted average of air and product properties through the expression:

$$c_v(T) = (1.0 - \phi^*EGR)^* c_{vair}(T) + (\phi^*EGR)^* c_{vstoichprod}(T) \qquad [20]$$

With the expression evaluated at the gas temperature corresponding to that for pressures sampled for the computation of signal bias.

Whether calculated through the preceding method or by some other method known in the art, the calculation of energy released within the combustion process for a given crank angle may be compared to an expected or theoretical total energy release for the combustion process. This comparison yields an estimate of mass fraction burn for use in describing combustion phasing.

The methods described hereinabove are readily reduced to be programmed into a microcontroller or other device for execution during ongoing operation of an internal combustion engine, as follows.

Once a mass fraction burn curve is generated for a particular combustion process, the curve is useful to evaluate the combustion phasing for that particular combustion process. Referring again to FIG. 7, a reference point is taken from which to compare mass fraction burn estimates from different combustion processes. In this particular embodiment, CA50%, representing the crank angle at which 50% of the charge is combusted, is selected. Other measures can be selected so long as the same measure is used for every comparison.

Determination of mass fraction burn values is a practice known in the art. Although exemplary methods are described above for determining mass fraction burn, the methods disclosed herein to utilize mass fraction burn values to diagnose cylinder combustion issues may be used with any method to determine mass fraction burn. Any practice for developing mass fraction burn may be utilized, and this disclosure is not intended to be limited to the specific methods described herein.

Additional methods exist to analyze cylinder pressure signals. Methods are known for processing complex or noisy signals and reducing them to useful information. One such method includes spectrum analysis through Fast Fourier Transforms (FFT). FFTs reduce a periodic or repeating signal into a sum of harmonic signals useful to transform the signal into the components of its frequency spectrum. Once the components of the signal have been identified, they may be analyzed and information may be taken from the signal.

Pressure readings from the pressure transducers located in or in communication with the combustion cylinders contain information directly related to the combustion occurring within the combustion chamber. However, engines are very complex mechanisms, and these pressure readings can contain, in addition to a measure of $P_{CYL}(\theta)$, a multitude of pressure oscillations from other sources. Fast Fourier Transforms (FFTs) are mathematical methods known in the art. One FFT method known as spectrum analysis analyzes a complex signal and separates the signal into its component parts which may be represented as a sum of harmonics. Spectrum analysis of a pressure transducer signal represented by $f(\theta)$ may be represented as follows:

$$FFT(f(\theta))=A_0+(A_1 \sin(\omega_0\theta+\phi_1))+(A_2 \sin(2\omega_0\theta+\phi_2))+\ldots+(A_N \sin(N\omega_0\theta+\phi_N)) \quad [21]$$

Each component N of the signal $f(\theta)$ represents a periodic input on the pressure within the combustion chamber, each increasing increment of N including signals or higher frequency. Experimental analysis has shown that the pressure oscillation caused by combustion and the piston moving through the various stages of the combustion process, $P_{CYL}(\theta)$, tends to be the first, lowest frequency harmonic. By isolating this first harmonic signal, $P_{CYL}(\theta)$ can be measured and evaluated. As is known in the art, FFTs provide information regarding the magnitude and phase of each identified harmonic, captured as the $\phi$ term in each harmonic of the above equation. The angle of first harmonic, or $\phi_1$, is, therefore, the dominant term tracking combustion phasing information. By analyzing the component of the FFT output related to $P_{CYL}$, the phasing information of this component can be quantified and compared to either expected phasing or the phasing of other cylinders. This comparison allows for the measured phasing values to be evaluated and a warning indicated if the difference is greater than a threshold phasing difference, indicating combustion issues in that cylinder.

Signals analyzed through FFTs are most efficiently estimated when the input signal is at steady state. Transient effects of a changing input signal can create errors in the estimations performed. While methods are known to compensate for the effects of transient input signals, the methods disclosed herein are best performed at either idle or steady, average engine speed conditions in which the effects of transients are eliminated. One known method to accomplish the test in an acceptably steady test period is to take samples and utilize an algorithm within the control module to either validate or disqualify the test data as being taken during a steady period of engine operation.

It should be noted that although the test data is preferably taken at idle or steady engine operation, information derived from these analyses can be utilized by complex programmed calculations or engine models to effect more accurate engine control throughout various ranges of engine operation. For example, if testing and analysis at idle shows that cylinder number four has a partially clogged injector, fuel injection timing could be modified for this cylinder throughout different ranges of operation to compensate for the perceived issue.

Once cylinder pressure signals have been analyzed through FFTs, information from the pressure signal can be used in variety of ways to analyze the combustion process. For example, the analyzed pressure signal can be used to generate a fractional pressure ratio as discussed in methods above and used to describe the mass fraction burn percentage to describe the progress of the combustion process.

Once a measure such as pressure readings are available, other descriptive parameters relating to a combustion process can be calculated. Sub-models describing particular characteristics of a combustion process can be employed utilizing physical characteristics and relationships known in the art to translate cylinder pressures and other readily available engine sensor terms into variable descriptive of the combustion process. For example, volumetric efficiency, a ratio of air-fuel charge entering the cylinder as compared to the capacity of the cylinder, can be expressed through the following equation:

$$\eta_{VE}=f(RPM, P_{im}, \dot{m}_a) \quad [22]$$

RPM, or engine speed, is easily measurable through a crankshaft speed sensor, as describe above. $P_{im}$, or intake manifold pressure, is typically measured as related to engine control, and is a readily available term. $\dot{m}_a$ or the fresh mass air flow portion of the charge flowing into the cylinder, is also a term frequently measured in the air intake system of the engine or can alternatively be easily derived from $P_{im}$, ambient barometric pressure, and known characteristics of the air intake system. Another variable descriptive of the combustion process that can be derived from cylinder pressures and other readily available sensor readings is charge flow into the cylinder, $\dot{m}_c$. $\dot{m}_c$ can be determined by the following equation:

$$\dot{m}_c = \frac{P_{im} \cdot rpm \cdot D \cdot \eta}{2RT_{im}} \quad [23]$$

D equals the displacement of the engine. R is a gas constant known in the art. $T_{im}$ is a temperature reading from the inlet manifold. Another variable descriptive of the combustion process that can be derived from cylinder pressures and other readily available sensor readings is EGR %, or the percentage of exhaust gas being diverted into the exhaust gas recirculation circuit. EGR % can be determined by the following equation:

$$EGR\ \% = 1 - \frac{\dot{m}_a}{\dot{m}_c} \qquad [24]$$

Yet another variable descriptive of the combustion process that can be derived from cylinder pressures and other readily available sensor readings is CAx, wherein x equals a desired fractional pressure ratio. CAx can be determined by the following equation, closely related to equation (2) above:

$$Z = \frac{P_{CYL}(\theta)}{P_{MOT}(\theta)} - 1 \qquad [25]$$

Filling in the desired fractional pressure ratio as Z and solving for θ yields CAx. For instance CA50 can be determined as the following:

$$\frac{P_{CYL}(\theta)}{P_{MOT}(\theta)} = 1.5 \qquad [26]$$

Various temperatures within the combustion chamber can also be estimated from cylinder pressures and other readily available sensor readings. FIG. 8 depicts a number of different temperatures capable of estimation within the combustion chamber important to describing the combustion process, in accordance with the present disclosure. $T_a$, the average temperature within the combustion chamber can be determined by the following equation:

$$T_a = \frac{P_{max} \cdot V(PPL)}{1.05 * \dot{m}_c R} \qquad [27]$$

$P_{max}$ is the maximum pressure achieved within the combustion chamber through the combustion process. PPL is a measure of the crank angle at which $P_{max}$ occurs. V(PPL) is the volume of the cylinder at the point $P_{max}$ occurs. $T_u$, the average temperature of the not yet combusted or unburned portion of the charge within the combustion chamber, can be determined by the following equation:

$$T_u = \frac{1.05 * \dot{m}_c}{1.05 * \dot{m}_c - \alpha \cdot \dot{m}_f \lambda_s} [0.05\beta T_{ex} + 0.95 T_{im}] \left(\frac{P_{max} - \Delta P}{P_{im}}\right)^{\frac{r-1}{r}} \qquad [28]$$

$\dot{m}_f$ is the fuel mass flow, and can be determined either from a known fuel rail pressure in combination with known properties and operation of the fuel injectors or from $\dot{m}_c$ and $\dot{m}_a$. α and β are calibrations based on engine speed and load and may be developed experimentally, empirically, predictively, through modeling or other techniques adequate to accurately predict engine operation, and a multitude of calibration curves might be used by the same engine for each cylinder and for different engine settings, conditions, or operating ranges. $\lambda_S$ is the stoichiometric air-fuel ratio for the particular fuel and includes values known in the art. $T_{ex}$ is a measured exhaust gas temperature. $T_{im}$ and $P_{im}$ are temperature and pressure readings taken at the intake manifold. $P_{max}-\Delta P$ describes the pressure in the combustion chamber just before the start of combustion. γ is a specific heat constant described above. $T_b$, the average temperature of the combusted or burned portion of the charge within the combustion chamber, can be determined by the following equation:

$$T_b = \frac{T_a - (1 - x_b)T_u}{x_b},\ x_b = \frac{\alpha \cdot \dot{m}_f (1 + \lambda_S)}{1.05 \dot{m}_c} \qquad [29]$$

Note that the above equations are simplified in a method known in the art by neglecting heat loss to cylinder wall. Methods to compensate for this simplification are known in the art and will not be described in detail herein. Through the use of the aforementioned relationships and derivations, cylinder pressure and other readily available sensor readings can be used to determine a number of parameters descriptive of the combustion process being monitored.

Figure 9:
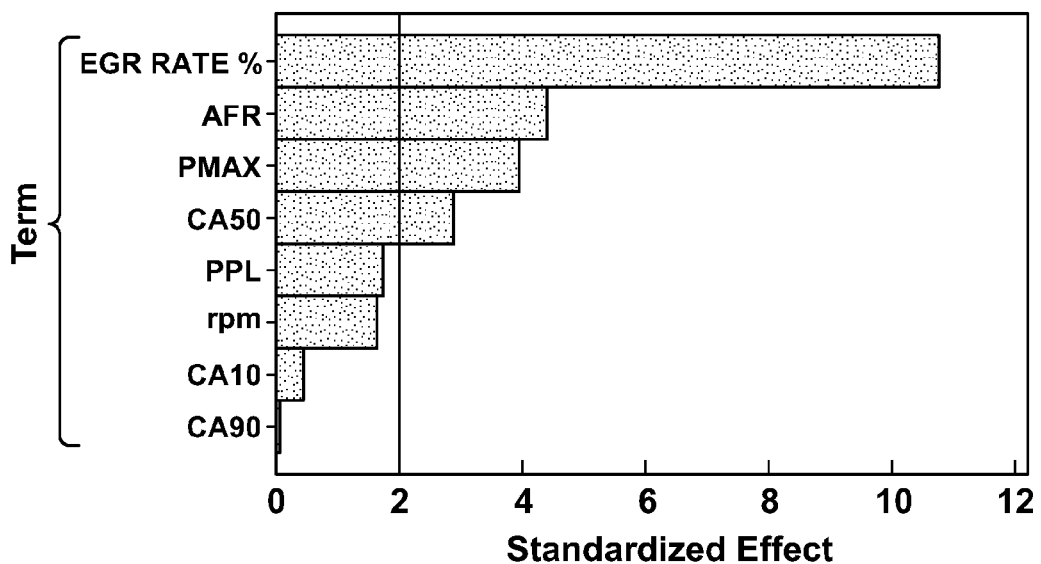
FIG. 9 is a graphical depiction of exemplary modeled results describing standardized effects of a number of inputs to NOx emissions under a given set of conditions, in accordance with the present disclosure.

As described above, cylinder pressure readings can be used to describe a state of combustion occurring within the combustion chamber for use as a factor in estimating NOx creation. Also as described above, a number of other factors are important to accurately estimating NOx creation. FIG. 9 is a graphical depiction of exemplary modeled results describing standardized effects of a number of inputs to NOx emissions under a given set of conditions, in accordance with the present disclosure. As described above, methods are known utilizing a model module and a NOx estimation module to simulate or estimate NOx creation based upon known characteristics of an engine. The model utilized to characterize NOx creation by a combustion process in this particular exemplary analysis can be characterized by the following expression:

$$NOx=NNT(P\text{max},CA50,CAp\ \text{max},EGR\ \%,AFR) \qquad [30]$$

As shown in the graphical results of FIG. 9, a number of factors have varying effects on NOx creation. Under this particular set of conditions, EGR % has the largest impact upon NOx creation for the engine modeled. In this instance, by methods known in the art, recirculating a particular amount of exhaust gas back into the combustion chamber through the EGR circuit lowers the adiabatic flame temperature of the combustion process, thereby lowering the temperatures that nitrogen and oxygen molecules are exposed to during combustion and, thereby, lowering the rate of NOx creation. By studying such models under various engine operating conditions, the neural network can be provided with the most useful inputs to provide accurate estimates of NOx creation. Additionally, studying such models provides information useful to selecting input data to initially train the neural network, varying inputs and providing corresponding outputs to sensor inputs and descriptive parameters most likely to impact NOx creation.

By methods described above, NOx creation estimates can be generated for a set of engine sensor inputs. As will be appreciated by one having ordinary skill in the art, equations and model predictions of engine operation frequently operate most effectively when the engine is operating at or near steady state However, observations and predictions can be made regarding the effects of transient or dynamic engine operation upon NOx creation estimates or the accuracy thereof. An exemplary expression describing a dynamic model or dynamic filtering module is shown by the following:

$$\frac{dNOx}{dt} = f(NOx, y, EGR\%, AFR, Ta, RPM) \qquad [31]$$

wherein contemporary NOx readings and an output y from a trained neural network are utilized to estimate a change in NOx creation. Such a change variable can be used to incrementally estimate NOx creation or can be used to check or filter NOx creation estimations. FIG. 14 schematically depicts an exemplary system generating a NOx creation estimate, utilizing models within a neural network to generate NOx creation estimates and including a dynamic model module to compensated NOx creation estimates for the effects of dynamic engine and vehicle conditions, in accordance with the present disclosure. NOx creation estimate system 400 comprises a model module 410, a neural network module 420, and a dynamic model module 430. Factors under current operating conditions most likely to impact NOx creation estimation under dynamic or changing conditions can be determined experimentally, empirically, predictively, through modeling or other techniques adequate to accurately predict engine operation. Inputs relating to these factors are fed to dynamic model module 430 along with output from neural network module 420, and the raw output from the neural network can be adjusted, filtered, averaged, de-prioritized or otherwise modified based upon the projected effects of the dynamic conditions determined by dynamic model module 430. In this way, the effects of dynamic engine or vehicle operation conditions can be accounted for in the estimation of NOx creation.

Figure 10:
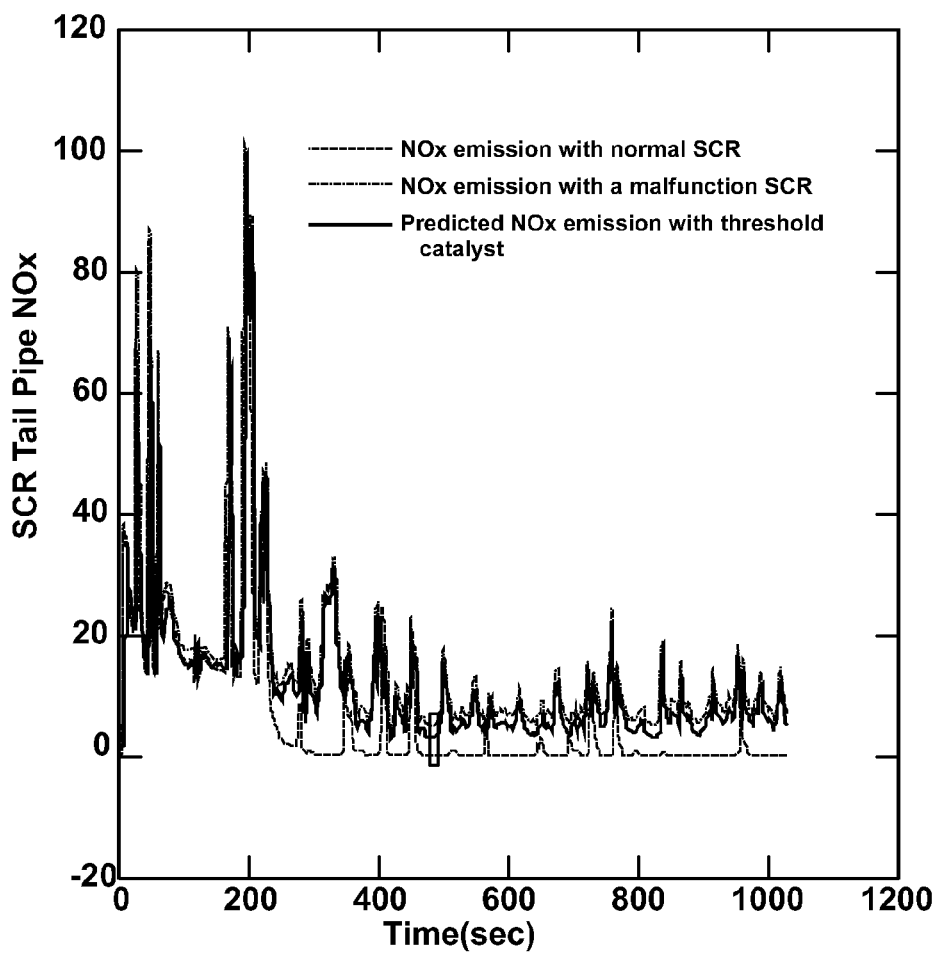
FIG. 10 graphically illustrates exemplary data, comparing predicted NOx exiting an aftertreatment system generated according to noisy input data, in accordance with the present disclosure.
Figure 11:
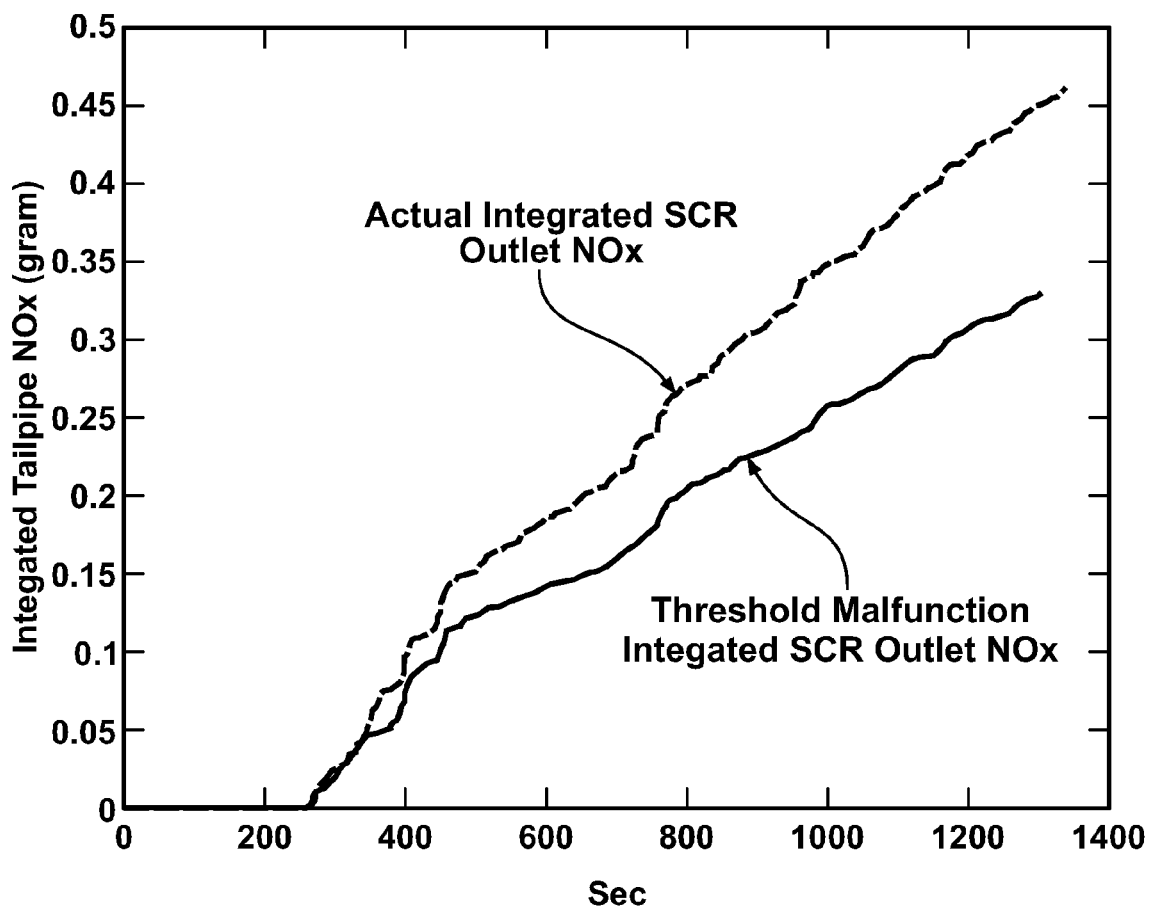
FIG. 11 graphically illustrates exemplary data processed through an integration calculation, in accordance with the present disclosure.

As described above, integration can be used as a low pass filter in the comparison of an actual conversion efficiency to a malfunction conversion efficiency. FIG. 10 graphically illustrates exemplary data, comparing predicted NOx exiting an aftertreatment system generated according to noisy input data, in accordance with the present disclosure. As is evident in the data plots, the data generated is choppy with a number of spikes. Interpretation of the various signals, especially a comparison of the various predicted NOx values at any given time, is prone to misinterpretation or false identifications. FIG. 11 graphically illustrates exemplary data processed through an integration calculation, in accordance with the present disclosure. As is evident in the data plots, comparison of the data curves generated through integration is greatly simplified, and the potential for misinterpretation or false identifications in a comparison are greatly reduced.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for indicating a malfunctioning catalyst in a powertrain including an internal combustion engine and an aftertreatment system having an aftertreatment device utilizing a catalyst to convert NOx, the method comprising:
monitoring an actual NOx content exiting the aftertreatment system;
monitoring factors affecting conversion efficiency of the aftertreatment device;
determining a predicted threshold NOx content exiting the aftertreatment system for an exemplary malfunctioning catalyst based upon the factors affecting conversion efficiency;
comparing the actual NOx content exiting the aftertreatment system to the predicted threshold NOx content exiting the aftertreatment system; and
indicating a malfunctioning catalyst based upon the comparing;
wherein monitoring the factors affecting conversion efficiency comprises:
monitoring a NOx content entering the aftertreatment system;
monitoring a bed temperature within the aftertreatment device;
monitoring a space velocity within the aftertreatment device; and
monitoring an amount of ammonia storage within the aftertreatment device.

2. The method of claim 1, wherein monitoring the NOx content entering the aftertreatment system comprises operating a virtual NOx sensor.

3. The method of claim 1, further comprising warning an operator of the powertrain based upon the indicating.

4. The method of claim 1, further comprising modulating operation of the powertrain based upon the indicating.

5. The method of claim 4, wherein modulating operation of the powertrain comprises commanding operation of the engine to create less NOx.

6. The method of claim 4, wherein modulating operation of the powertrain comprises operating the aftertreatment system assuming decreased performance from the malfunctioning catalyst.

7. Method for indicating a malfunctioning catalyst in a powertrain including an internal combustion engine and an aftertreatment system having an aftertreatment device utilizing a catalyst to convert NOx, the method comprising:
monitoring an actual NOx content exiting the aftertreatment system;
monitoring factors affecting conversion efficiency of the aftertreatment device;
determining a predicted threshold NOx content exiting the aftertreatment system for an exemplary malfunctioning catalyst based upon the factors affecting conversion efficiency;
comparing the actual NOx content exiting the aftertreatment system to the predicted threshold NOx content exiting the aftertreatment system; and
indicating a malfunctioning catalyst based upon the comparing;
wherein monitoring the actual NOx content exiting the aftertreatment system comprises:
monitoring a NOx sensor located downstream of the aftertreatment system; and
determining the actual NOx content exiting the aftertreatment system based upon integrating data from the monitored NOx sensor located downstream of the aftertreatment system through a time period; and
wherein determining the predicted threshold NOx content exiting the aftertreatment system for the exemplary malfunctioning catalyst comprises
determining an instantaneous predicted threshold NOx content exiting the aftertreatment system based upon the factors affecting conversion efficiency, and
determining the predicted threshold NOx content exiting the aftertreatment system based upon integrating instantaneous predicted threshold NOx content exiting the aftertreatment system through the time period.

8. Method for indicating a malfunctioning catalyst in a powertrain including an internal combustion engine and an aftertreatment system having an aftertreatment device utilizing a catalyst to convert NOx, the method comprising:
- monitoring an actual NOx content exiting the aftertreatment system;
- monitoring factors affecting conversion efficiency of the aftertreatment device;
- determining a predicted threshold NOx content exiting the aftertreatment system for an exemplary malfunctioning catalyst based upon the factors affecting conversion efficiency;
- comparing the actual NOx content exiting the aftertreatment system to the predicted threshold NOx content exiting the aftertreatment system; and
- indicating a malfunctioning catalyst based upon the comparing;

wherein determining the predicted threshold NOx content exiting the aftertreatment system for the exemplary malfunctioning catalyst comprises utilizing a look-up table.

9. Method for indicating a malfunctioning catalyst in a powertrain including an internal combustion engine and an aftertreatment system having an aftertreatment device utilizing a catalyst to convert NOx, the method comprising:
- monitoring an actual NOx content exiting the aftertreatment system;
- monitoring factors affecting conversion efficiency of the aftertreatment device;
- determining a predicted threshold NOx content exiting the aftertreatment system for an exemplary malfunctioning catalyst based upon the factors affecting conversion efficiency;
- comparing the actual NOx content exiting the aftertreatment system to the predicted threshold NOx content exiting the aftertreatment system; and
- indicating a malfunctioning catalyst based upon the comparing;

wherein determining the predicted threshold NOx content exiting the aftertreatment system for the exemplary malfunctioning catalyst comprises calculating the predicted threshold NOx content exiting the aftertreatment system for the exemplary malfunctioning catalyst with a programmed functional relationship;

wherein calculating the predicted threshold NOx content exiting the aftertreatment system for the exemplary malfunctioning catalyst with the programmed functional relationship comprises:
- determining a predicted nominal NOx content exiting the aftertreatment system for an exemplary fresh catalyst based upon the factors affecting conversion efficiency of the aftertreatment device; and
- calculating the predicted threshold NOx content exiting the aftertreatment system for an exemplary malfunctioning catalyst by dividing the predicted nominal NOx content exiting the aftertreatment system for the exemplary fresh catalyst by a calibratable threshold factor.

10. The method of claim 9, wherein the calibratable threshold factor is based upon a space velocity within the aftertreatment device and a bed temperature within the aftertreatment device.

11. Method for indicating a malfunctioning catalyst in a powertrain including an internal combustion engine and an aftertreatment system having an aftertreatment device utilizing a catalyst to convert NOx, the method comprising:
- monitoring an actual NOx content exiting the aftertreatment system;
- monitoring factors affecting conversion efficiency of the aftertreatment device;
- determining a predicted nominal NOx content exiting the aftertreatment system for an exemplary fresh catalyst based upon the factors affecting conversion efficiency of the aftertreatment device;
- comparing the actual NOx content exiting the aftertreatment system and the predicted nominal NOx content exiting the aftertreatment system for the exemplary fresh catalyst; and
- indicating a malfunctioning catalyst if the actual NOx content exiting the aftertreatment system exceeds the predicted nominal NOx content exiting the aftertreatment system for the exemplary fresh catalyst by more than a threshold NOx content above nominal;

wherein the monitoring factors affecting conversion efficiency comprises:
- monitoring a NOx content entering the aftertreatment system;
- monitoring a bed temperature within the aftertreatment device;
- monitoring a space velocity within the aftertreatment device; and
- monitoring an amount of ammonia storage within the aftertreatment device.

12. System for indicating a malfunctioning catalyst in a powertrain including an internal combustion engine and an aftertreatment system having an aftertreatment device utilizing a catalyst to convert NOx, the system comprising:
- the aftertreatment device;
- a sensor located to detect NOx content present in an exhaust gas flow downstream of the aftertreatment device; and
- a control module
    - monitoring the sensor located to detect NOx content present in an exhaust gas flow downstream of the aftertreatment device,
    - monitoring factors affecting conversion efficiency of the aftertreatment device,
    - determining a predicted threshold NOx content exiting the aftertreatment system for an exemplary malfunctioning catalyst based upon the factors affecting conversion efficiency,
    - comparing data from the sensor located to detect NOx content present in an exhaust gas flow downstream of the aftertreatment device to the predicted threshold NOx content exiting the aftertreatment system, and
    - indicating the malfunctioning catalyst based upon the comparing;

wherein the control module determining the predicted threshold NOx content exiting the aftertreatment system comprises utilizing a look-up table.

13. The system of claim 12, the control module further generating commands to change operation of the engine based upon the indication of the malfunctioning catalyst.

14. The system of claim 12, the control module further generating commands to change operation of the aftertreatment system based upon the indication of the malfunctioning catalyst.

* * * * *